Patented Mar. 14, 1939

2,150,284

UNITED STATES PATENT OFFICE 2,150,284

WASHING AND CONDITIONING MATERIAL FOR CITRUS FRUIT

John R. MacRill, Whittier, and Robert D. Nedvidek, Pomona, Calif., assignors to California Fruit Growers Exchange, Los Angeles, Calif., a corporation of California No Drawing. Continuation of application Serial No. 705,026, January 2, 1934, which is a division of Serial No. 440,156, March 29, 1930. This application November 19, 1937, Serial No. 175,471

1 Claim. (Cl. 99—168)

Those conversant with the art of processing citrus fruit are well aware of the number of difficult problems which must be met and disposed of before oranges and other citrus fruit are successfully and economically brought from the groves and placed in the hands of the ultimate consumer. The major problem in this art is that of cleaning and conditioning the fruit in such a way that it may reach the market in the most satisfactory and successful condition. This problem includes the treatment of the fruit so as to prevent the development of molds thereon and the elimination of insect life on the fruit.

Fruit fresh from the grove is never clean. Citrus groves are always carefully cultivated, which gives rise to quantities of dust and dirt, which in turn collect on the fruit. Furthermore, citrus groves are generally sprayed for the control of various insects, fungi and the like, and the sprays always leave residues on the fruit.

Furthermore, mealy bug deposits, black scale deposits, other insect deposits of various kinds and black smut are all found in varying amounts on the fruit. From time to time, whenever it is necessary to warm the groves by the procedure known as "smudging", a considerable deposit of soot or smudge necessarily occurs on the surface of the fruit. Obviously, any and all of the foregoing materials, as well as any other similar foreign matter, must be completely removed from the fruit and the surface given a rather glossy polish, before it is ready for marketing. Polishing the fruit enhances its appearance and therefore its sales value.

In addition to the above, fruit coming from the groves to the packing houses is frequently found to be infested with the bean thrips or *Heliothrips fasciatus* as well as other forms of insect life. The fruit may, moreover, be infected with the well known blue mold or other molds, and in its natural state the fruit is highly susceptible to mold infection, which may occur during and by the packing house handling alone.

It is apparent that before fruit may be placed on the market, it must likewise be free from any insect infestation and should preferably be rendered immune to the attack of the blue mold and/or other molds as well.

The present application is a continuation of co-pending application Serial No. 705,026, filed January 2, 1934, which was a division of and co-pending with application, Serial No. 440,156 filed March 29, 1930, issued June 15, 1937 as Patent No. 2,084,062, in which a simple and effective process of cleansing and conditioning fruits is disclosed. That process simultaneously cleans and conditions fruit, the application of waxy material at the same time being optional.

An object of this invention is to disclose and provide a combined washing and conditioning solution for use in the treatment of citrus fruit.

Another object is to disclose and provide a solution containing a hydrocarbon dispersed therein, such solution being particularly adapted for the simultaneous cleaning and mold-inhibiting treatment of citrus fruit.

Still other objects and advantages of our invention will become apparent to those skilled in the art from a contemplation of the invention as set forth hereinafter.

Although the prior art has disclosed methods by means of which citrus fruits could be treated so as to inhibit the development of molds, the prior art has not disclosed a method by means of which the fruit could be freed from insect pests, such as the bean thrips. The bean thrips, *Heliothrips fasciatus*, referred to above, is most particularly difficult to eradicate, due to its habit of secreting itself under the button of the fruit and in the navel of the navel orange. There, minute air pockets are formed which enable the insect to be protected from the influence of any liquid with which the fruit as a whole may be placed in contact. These minute air pockets are not ordinarily penetrated by washing or treating fluids, and even when penetrated to some extent by those fluids in use heretofore, sufficient amounts of the material did not reach the insect to completely destroy it.

In the use of our invention, and particularly by the use of the particular treating agents defined hereinafter, all parts of the most minute crevices of the fruit are effectively reached and completely cleansed, and thus any insect infestation is completely eradicated.

Furthermore, although ordinary soap solutions have been employed in the cleansing of citrus fruits for a great many years, such prior cleansing solutions have not been capable of effectively removing all of the various forms of foreign matter with which the fruit is commonly covered. In other words, although ordinary dust and dirt could be removed by such prior cleansing solutions, the oily smudge or smut and insect deposits could not be completely removed without the use of other specially prepared solvents, which in turn did not successfully remove dirt or smudge. Furthermore, strong cleansing solutions and solvents tend to remove the naturally occurring waxes present in the skins of the fruit. such wax removal accelerating the wrinkling and shrinkage of the fruit.

Briefly, our invention comprises soaking and/or washing and/or treating the fruit in a specific and predetermined manner with certain materials or combinations of materials, all as set forth hereinafter, so as to simultaneously cleanse the fruit and condition the fruit, whereby the fruit is rendered highly resistant to attacks by molds and so treated as to present a polished and glossy surface. The wax content of the fruit, by this method, is maintained at or above the content of natural waxes present in the skins of the fruit, thus preventing wrinkling or shrinkage. In order for those skilled in the art to practice the invention, more specific forms of the various materials and modes of operation will be set forth below.

In practicing the invention, we may employ as a base a soap solution. Such soap solution preferably contains an emulsion. The emulsion may be either a kerosene emulsion, or an emulsion containing a mold-inhibiting agent, such as pine oil or citrus terpenes; or both may be employed together.

Pine oil is a light-colored liquid of lighter specific gravity than water, obtained by extraction with a petrol solvent from pine chips. Pine oil normally contains borneol, alpha terpinol and dipentene. It has been found that in the preparation of these emulsions it is highly desirable to employ a water-soluble soap, and preferably an oleic acid soap of high purity. It has been found that an ethanolamine soap, such as triethanolamine oleate, produces emulsions which disperse readily when added to the basic soap solution, and which are thoroughly dispersed in the soap solution, thus assuring the penetration of all crevices and apertures in the fruit with the treating solution. Such penetration is, as stated hereinabove, essential in order to eradicate insect pests such as the bean thrips, inasmuch as such minute insects are normally found in such crevices. It is to be understood that this type of soap may be added as a separate ingredient to the mixture of materials employed in forming the emulsion, or such soap may be formed by the addition of oleic acid and ethanolamine so as to form the soap during the formation of the emulsion.

Throughout the following specification, parts are to be understood as parts by volume unless otherwise specified. Percentage values are to be understood as per cent by weight unless otherwise indicated.

We understand that the following values are approximately correct for the weight of one gallon of each of the liquids given:

|  | Pounds |
|---|---|
| Citrus terpenes | 7.0 |
| Cottonseed oil | 7.7 |
| Kerosene | 6.7 |
| Oleic acid | 7.3 |
| Pine oil | 7.2 |
| Stearic acid | 7.1 |
| Triethanolamine | 9.3 |
| Water | 8.3 |

One type of emulsion which may be employed, and hereafter referred to as a type of kerosene emulsion, may be formed by mixing two parts of kerosene with one part of water and adding thereto about 1%, and preferably less than 2%, of an oleate soap of the character described hereinabove, on the total weight of kerosene and water.

When an oleic acid soap is used, quantities as small as ¼ of an ounce of soap per gallon of kerosene may be successfully employed. Preferably, the soap is dissolved in the water and the kerosene then added with agitation, so as to get a good emulsion. More thorough agitation is needed when small quantities of soap are used.

The kerosene may contain paraffin wax, vegetable oil, mineral oil or liquid petrolatum, or mixtures of these ingredients. The paraffin and/or wax may be used in varying amounts, such as from 0.05 to 1 pound per gallon of kerosene or other hydrocarbon solvent of this type. This is equivalent to about 0.75% to 15% of wax by weight of kerosene. When wax is used, it may be melted and poured into the kerosene or shaved or disintegrated and allowed to dissolve therein. When vegetable oil is employed, from about 0.1 to 1 quart of oil may be added per gallon of kerosene, which is equivalent to about 2.8 to 28% of oil by weight of kerosene; when mineral oil is used, it may be added in the proportion of about 0.05 to 0.4 quarts per gallon of kerosene, which is equivalent to about 1.3 to 10.4% of oil by weight of kerosene.

It is to be understood that when two or more of the above substances are combined in the kerosene, the maximum proportions given above should not all be used together, although greater than the minimum proportions given may be used in combination. The exact proportions can be readily adjusted according to the result desired, and when one of these ingredients is increased the others may ordinarily be reduced correspondingly.

As an example of the type of emulsion defined hereinabove, we may take 100 pounds of kerosene containing 1 to 10% of a vegetable oil such as linseed oil or cottonseed oil; 6 pounds of triethanolamine oleate are thoroughly dissolved in the kerosene, and such kerosene then thoroughly mixed with water in the proportion of from 2 to about 3 parts of kerosene to 1 part of water.

As another specific example of an emulsion coming within the general class described hereinabove, we may take 4 parts of kerosene containing from 2 to 20 quarts of vegetable oil per 20 gallons of kerosene, and add to it about 6% by weight of oleic acid. Such kerosene may then be intimately mixed to 1 part of water to which has been added triethanolamine in the amount of about 2% by weight on the basis of the weight of the kerosene.

It is to be understood that pine oil emulsions may be used in conjunction with the kerosene emulsion in the bath. For example, the emulsion may be produced by employing 1 part kerosene, 1 part of pine oil and 1 part of water, the emulsifying agent in this case being about 1% of the total weight of a suitable soap, gelatin, or other emulsifying agent stable in alkaline solutions.

A pine oil emulsion may be prepared, for example, by intimately mixing 6 parts of pine oil with about 5% by weight of oleic acid and 2% by weight of triethanolamine, said triethanolamine being dissolved first in 4 parts of water.

A pine oil emulsion may be added to a soap solution in sufficient quantities so as to produce a final concentration of pine oil in the bath of from about 0.02% to 0.25%. Preferably, the final concentration of pine oil should be kept within the limits of about 0.06% to 0.15%. Sufficient soap should be used to form a good suds. More may be added as and if needed. The temperature of the bath is preferably about 100° to 120° F. and the time of contact with the fruit is preferably about 2 to 6 minutes. A kerosene emulsion of the type described above may be added to the soap solution. This may vary over the range ½% to 20%, on the basis of the water of the soap solution, and will be regulated in accordance with the character of the fruit to be cleaned and conditioned; it being obvious that very dirty fruit requires more cleansing agent and vice versa. Thus, when comparatively clean fruit is being handled, comparatively small amounts of a kerosene emulsion comparatively rich in oily and/or waxy ingredients may be used. The final washing and treating bath should not contain more than about 15% of kerosene, and preferably not more than 10% of kerosene. Smaller quantities are often adequate.

It is to be understood that in each of the emulsions mentioned hereinabove, whether kerosene or pine oil emulsions, the ingredients such as paraffin and/or wax and/or vegetable oil and/or mineral oil or liquid petrolatum may be used. It is particularly desirable to employ a waxy material such as paraffin when pine oil is used inasmuch as the pine oil is dissolved in the wax or liquid petrolatum and forms an unsubstantial film on the treated fruit, such film imparting a glossy appearance to the fruit and containing the pine oil in insignificant quantities, but quantities sufficient to retard the development of molds on the fruit. When other waxes are used, a wax such as beeswax or carnauba wax is preferred.

The emulsions of the character described hereinabove may be prepared and then added to a suitable soap solution in the washing tank.

In addition to or instead of treating the fruit with an emulsion or combination of emulsions as set forth above, we may treat the fruit with a slightly different type of kerosene emulsion. For example, we take about 95 gallons of water and dissolve in it about 7½ pounds of a good commercial soap powder. We find that a soap powder made from cottonseed foots and cocoanut oil, and which contains about 35% of soda ash is very satisfactory for the purpose of this invention. In fact, we have found that the use of soda ash in conjunction with emulsions of the type here disclosed is desirable as, for example, in that soda ash increases the stability of the resulting solution or emulsion. To this soap-powder-water mixture we add a kerosene emulsion consisting of about 5 gallons of kerosene and 2½ gallons of water in which 10 ounces of oleic acid soap of high purity have been dissolved.

The final concentration of kerosene in the final emulsion consisting of the soap solution and the more concentrated kerosene emulsion, should preferably be maintained at about 5%, for the sake of economy, although the kerosene emulsion may be added to the soap solution in quantities sufficient to increase the content of kerosene in the final treating solution or emulsion. The bath prepared in this manner is kept at a temperature of from about 110° to 120° F., and the citrus fruit submerged in it for a period of time of from about 4 to 10 minutes, and preferably about 5 minutes. Such treatment is especially efficacious in eradicating the *Heliothrips fasciatus* and simultaneously removing any and all dirt, deposits or other foreign matter from the fruit.

Although it was stated hereinabove that the fruit is to be submerged in the treating bath, it is to be understood that complete immersion may not be entirely necessary, it only being desirable that all portions of the fruit be thoroughly contacted with the treating solution.

After the fruit have been immersed in the treating bath, they may pass to brushing rolls where the fruit is sprayed, preferably with the same solution as that existing in the bath. When fresh water is employed for spraying purposes, it should ordinarily be confined to the latter half of the brushing rolls.

After leaving the brushing rolls, the fruit may or may not go into additional tanks for further treatment. Such additional tank or tanks may contain a solution similar to that in the first tank, and/or other agents such as mold-retarding agents which it is desired to have come in contact with the fruit. Inasmuch as the fruits are now in a thoroughly cleansed condition, the effect of the mold-inhibiting or retarding agents on the fruit is enhanced when such agents are used in subsequent tanks. After such complete treatment the fruit is then disposed of in known ways, according to packing house methods.

In case of lemons going to storage, for example, the fruit need not be dried or brushed, whereas fruit being sent to packing and shipping operations is preferably dried and brushed. Dry lemons, that is, lemons coming out of storage, particularly when not originally treated in accordance with the method of this invention, may be advantageously subjected to the action of the cleansing and conditioning solution of this invention upon being removed from storage.

In general, therefore, this invention relates to a simultaneous cleaning and treatment of citrus fruits by means of an aqueous soap solution containing a kerosene emulsion and/or a pine oil emulsion, or a mixture of pine oil and kerosene in emulsified condition, the oily ingredients such as pine oil or kerosene being in the internal or dispersed phase.

In this manner, the fruit is completely cleansed and at the same time thoroughly freed from infection and insect infestation. Moreover, treatment of the fruit in accordance with this invention retards decay from green or blue mold as well as other forms of diseases, such as alternaria. If a pine oil emulsion is used, the pine oil apparently is absorbed in the waxy outer coatings ordinarily found on the fruit and thus retained on the fruit, in the form of an inhibiting agent. The emulsions of kerosene, etc., described herein, may be contacted with fruit after the fruit have been cleansed by some other method.

Fruit treated with this invention are substantially free from tangible evidence of the presence of foreign matter. In other words, the pine oil concentrations are of such order that their odor is not perceptible. When waxes or heavy oils, such as vegetable oils or mineral oil, are employed in the emulsions, the quantities employed are not sufficient to form a film on the outer surfaces of the fruit which is perceptible to the touch, and the only indication of their presence is the glossy, polished appearance of the fruit. Furthermore, the use of kerosene emulsions of this type does not result in fruit which bear the odor of kerosene.

In addition, the invention contemplates the use of a soap such as triethanolamine oleate. It should be understood that wherever we have spoken of triethanolamine we have had reference to the commercial product which apparently contains about 70% to 75% triethanolamine, 20% to 25% diethanolamine and 0.02% to 5% of monoethanolamine. Any one of the pure substances would, of course, give equally satisfactory results, the proportions being varied correspondingly.

Having thus completely disclosed our invention and the manner in which the same is to be used, we claim as our invention the following.

We claim:

A washing and conditioning solution whereby citrus fruit may be cleansed of foreign matter and simultaneously provided with a pine oil or citrus terpenes and waxy film during such cleansing operation, comprising: an aqueous soap solution to which there has been added an emulsion of kerosene and waxy material and an ethanolamine soap, and from about 0.02% to 0.25% of a material from the group consisting of pine oil and citrus terpenes, the treating solution containing less than about 10% of kerosene and from about 0.75% to 15% of waxy material by weight of said kerosene.

JOHN R. MacRILL.
ROBERT D. NEDVIDEK.